UNITED STATES PATENT OFFICE.

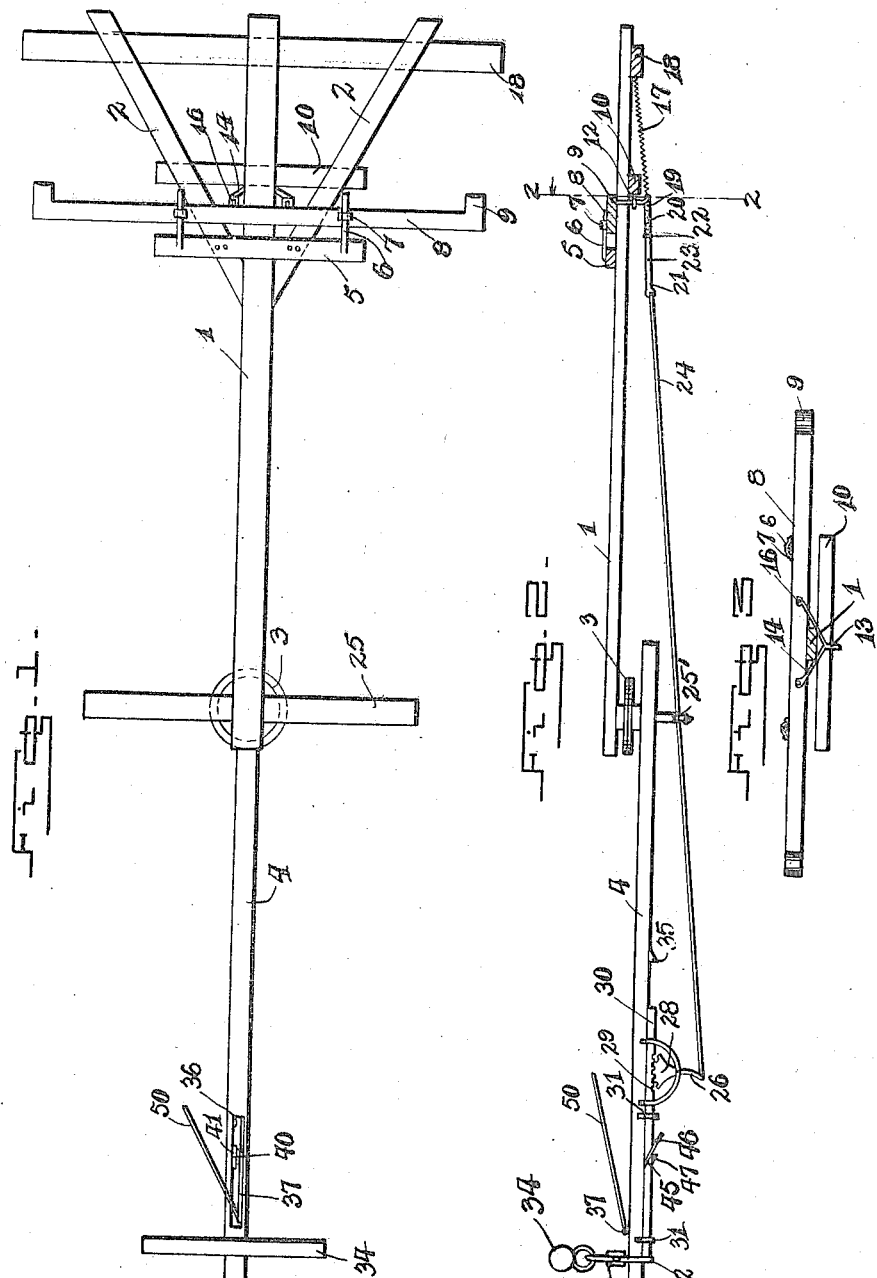

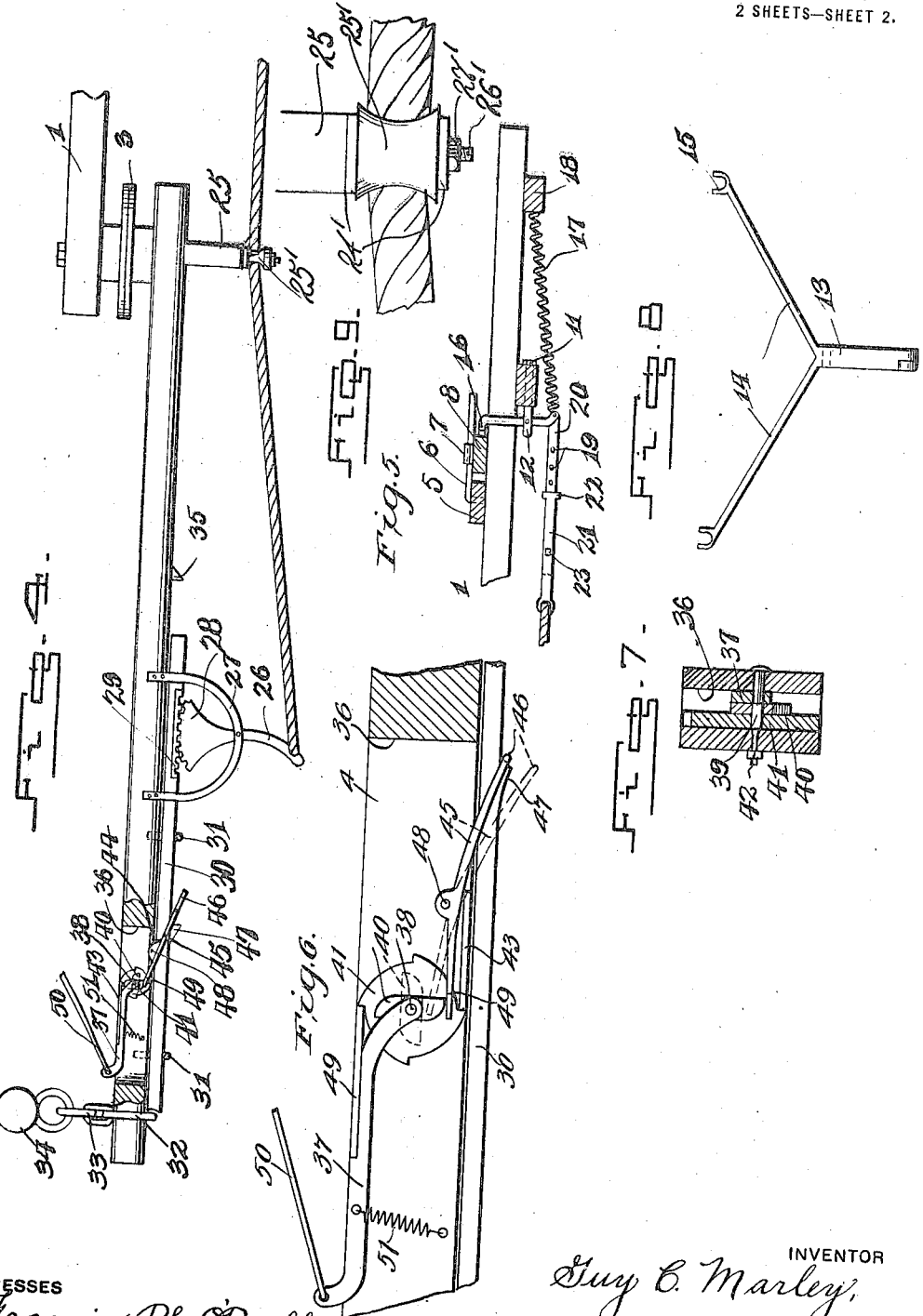

GUY C. MARLEY, OF FORT MADISON, IOWA.

VEHICLE-BRAKE.

1,233,383. Specification of Letters Patent. Patented July 17, 1917.

Application filed November 13, 1915. Serial No 61,319.

*To all whom it may concern:*

Be it known that I, GUY C. MARLEY, a citizen of the United States, residing at Fort Madison, in the county of Lee and State of Iowa, have invented certain new and useful Improvements in Vehicle-Brakes, of which the following is a specification.

My invention relates to new and useful improvements in brakes and more particularly to a vehicle brake and operating means therefor.

The primary object of my invention resides in the provision of a novel operating means for the braking means, controlling means being associated therewith to permit of the arranging of the operating means in an operative position so that when the animals attached to the vehicle are held back the ring to which the yoke is connected will contact with the operating means and cause the latter to automatically apply the brakes.

Another object of my invention resides in the provision of a novel resilient means associated with the brakes for returning the operating means to its normal position after the level has been reached or when the animals connected to the vehicle are driven forwardly.

A further object of my invention resides in the provision of a novel controlling means actuatable through the medium of a cable or cord held by the driver of the vehicle, the controlling means being peculiarly arranged so that when it is operated the operating means will be placed in an operative position, resilient means being associated with the controlling means for returning the same into an inoperative position so that it can be subsequently operated.

Another object of my invention resides in the provision of a novel means for mounting the braking means and for controlling the sliding movement of the braking means while it is being operated.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a top plan view of my invention;

Fig. 2 is a side elevational view of my invention;

Fig. 3 is a transverse sectional view of my invention taken on the line 2—2 of Fig. 2;

Fig. 4 is an enlarged side elevational view of my invention, a portion of the tongue being broken away to illustrate the construction and arrangement of the controlling means;

Fig. 5 is a side elevational view of my invention partly in section, illustrating to advantage the construction and arrangement of the brake, the means for adjusting the sliding movement of the brake, and means for returning the operating means to its normal position;

Fig. 6 is an enlarged side elevation of the controlling lever and trip mechanism for locking and unlocking the brake actuating mechanism, and showing in full and dotted lines the locked and unlocked position of trip mechanism.

Fig. 7 is a transverse sectional view through the tongue and the pivoting bolt for the ratchet, et cetera; and Fig. 8 is an enlarged end elevational view of the forked lever which is associated with the brake proper.

Fig. 9 is an enlarged side elevational view of the rollers showing the cable associated therewith.

Referring more particularly to the drawings in which similar reference numerals designate like or corresponding parts throughout the different views, I have associated with one end of a reach bar 1, rear hounds 2, the forward end of the reach bar having a fifth wheel 3 associated therewith, the latter in turn being associated with the tongue 4. It is to be understood that I have shown these parts merely for the purpose of clearly illustrating my invention and that they are not to form any essential part thereof. Mounted upon the upper surface of the reach bar adjacent the hounds 2 is a transverse bar 5, from adjacent the opposite ends of which extend lateral rods 6, the latter in turn being slidably associated with ears 7 carried by the upper surfaces of a brake bar 8. Shoes 9 are formed integral with the ends of the brake bar and adapted for engagement with the rear wheels, not shown of the vehicle on which the reach bar is associated. Secured to the under surface of the hounds 2 is another transverse bar 10 through the intermediate portion of which is mounted a bolt 11 having an elongated head 12 to which is pivotally connected a forked lever 13. The arms 14 of this lever are straddled about the reach bar 1 and have their free ends bifurcated as illustrated by the numeral 15 and pivotally connected to the brake bar as illustrated by the numeral 16.

In order to normally maintain the brake bar and shoes in an inoperative position and to also throw the operating means to its normal position after it has been actuated, in a manner to be hereinafter described, I have provided my improved resilient means in this instance comprising a coil spring 17, the respective ends of which are connected to a transverse bar 18 carried by the hounds 2 and to the free end of the lever 13. In order to control the sliding movement of the brake bar, I have pivotally connected one end of the rod 19 thereto, said rod being provided with a plurality of uniformly spaced openings 20 and slidably engaged by another rod 21 through the medium of flanges 22. This rod 21 is maintained in various adjusted positions to the rod 19 through the medium of a suitable pin 23, which is engageable in one of the openings 20.

In order to operate the brake shoes, I have connected one end of the cable 24 to the free end of the rod 21, the cable being drawn between a pair of rotatably mounted rollers 25' to facilitate the operation of the cable and reduce friction to a minimum. The rollers are positioned between plates 24', the upper one of which is connected to the under surface of the transverse bar 25 while rotation of the rollers is effected through the medium of bolts 26' which extend from the bar 25 through the plates, nuts 27' being associated with the bolts for facilitating the supporting of the rollers. The free end of the rod is also connected to one end of the lever 26. This lever is pivotally mounted intermediate its ends to a U-shaped bracket 27 securable to one side of the tongue, the opposite end of the lever having a segmental gear 28 formed thereon, the teeth of which are adapted to engage a rack 29 carried on the under surface of a slidably mounted rod 30. This rod 30 is mounted on the under surface of the tongue through the medium of suitable guides 31, the free end of the rod being arranged normally adjacent the free end of the tongue and is engageable at times through the medium of a tongue engaging ring 32, the latter being in movable connection as at 33 with a yoke 34. It is to be understood that the animals, not shown, which are used for pulling the vehicle are connected to this yoke 34. Now, when the animals are held back the ring will bear against and slide the rod 30, the inward movement of which latter is limited through the medium of a lug 35 formed on the under surface of the tongue. For the purpose of controlling the operation of the operating means, I have provided my novel controlling means. In this instance this novel means is arranged within a longitudinal slot 36 adjacent the outer end of the tongue and includes an operating lever 37 pivoted at its inner end to a transversely extending bolt 38. The shank of the bolt 38 is rounded adjacent the head to permit of rotation of the bolt therein and to permit of pivotally connecting the lever thereto. The portion adjacent the inner rounded portion is squared as illustrated by the numeral 39 so that a trip 40 and a ratchet wheel 41 may be rigidly connected thereto, the free end of the bolt being reduced, rounded and threaded to permit of rotation of the bolt and removably secured in position through the medium of a nut 42, this construction being illustrated to advantage in Fig. 7 of the accompanying drawings. A spring pawl 43 is mounted on the upper surface of the lever 37 and engages one of the notches in the ratchet wheel, another pawl 44 being rigidly connected adjacent the bottom of the slot and engaged in a notch diametrically opposite that in which the pawl 43 is engaged. A retaining element 45 is pivotally mounted intermediate its ends as illustrated by the numeral 48. One end of this element is curved to provide a substantial hook 46 which is arranged transversely of the slide bar 30 so as to engage a lug 47 on the undersurface of the slide bar 30 while the other terminal of the element is arranged adjacent the trip 40 as illustrated by the numeral 49. Now when a cord 50 which is connected to the free end of the lever 37 is pulled against the tension of a spring 51, which incidentally normally maintains the lever in a substantially horizontal position, the lever is raised which causes the pawl 43 to move the ratchet in which it is engaged downwardly simultaneously causing the trip 40 to also partially rotate and assume the position shown in Fig. 4 thereby allowing the hook 46 of the retaining element to fall beneath the plane of the lug 47 which will permit the draft animals to act upon the sliding bar and consequently apply the brake. By again pulling the cord 50 the ratchet wheel and trip will be again partially rotated, the trip being arranged in a substantially vertical position and bearing against the inner end 49 of the retaining element and causing the hook 46 thereof to lie in abutting relation with the under surface of the lug and prevent the sliding of the bar. The subsequent operation of the lever will cause the retaining element to be placed in a position to permit of the operation of the sliding bar and by continuously pulling, the retaining element will be alternately held in a position to prevent and allow the operation of the sliding bar through the medium of the draft animals, not shown, attached to the vehicle to which the reach is associated. During the operation of the ratchet the pawl 44 prevents rotation of the ratchet in a reverse direction during the operation of the lever.

The operation of my invention is as follows:

Assuming that a vehicle having draft animals attached thereto is going down a steep grade and that my invention is associated with this vehicle, the driver when applying the brakes will pull the cord 50 which will raise the lever and operate the ratchet and trip and consequently operate the retaining element to permit of sliding movement of the bar. During this movement by drawing in on the lines, not shown, attached to the draft animals, inward movement of the loop 32 on the tongue will be imparted to the sliding bar 30 and due to the rack acting on the segmental gear ends 28 of the lever 26, the latter will rotate about its pivot and draw on the cable 24 against the tension of the spring 17, consequently moving the forked lever 13 about its pivot and drawing the brake shoes into engagement with the rear wheels, not shown, of the vehicle.

Although I have shown and described the preferred embodiment of my invention, I desire to be understood that I am not to be limited to the exact details shown, however, I desire that great stress be laid upon the arrangement of the novel brake means and operating means therefor, which latter has coöperating therewith my improved controlling means for preventing and allowing the actuation of the operating means.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A vehicle brake including a slidably mounted brake bar, a lever pivotally connected thereto, connecting rods adjustably associated with each other and connected to the lever, a cable extending from one of the connecting rods, a pivotally mounted lever having one end associated with the opposite end of the cable, a segmental gear formed on the other end of the pivotally mounted lever, a slidably mounted bar for association with the pole of a vehicle, a rack carried by the sliding bar for engagement with the segmental gear, said bar being operable by the draft animals attached to a vehicle with which the device is associated, movable operable means for controlling the actuation of the sliding bar, and means for returning the sliding bar and the brake bar to their normal positions.

2. A vehicle brake including slidably mounted brake means, a slidably mounted bar adapted to be operated by the draft animals, means connecting the bar and the brake means whereby when the bar is moved the brake means will be applied, a rotatably mounted ratchet, pawls for holding the ratchet in a set position, a rotatably mounted trip, a manually operable lever for supporting one of the pawls to consequently move the ratchet and the trip, and retaining means operable by the trip for releasing the slidably mounted bar to permit of the actuation of the brake means, and resilient means associated with the brake means for returning the brake means to a normal position and for sliding the bar in a reverse direction to a position where the lever can be operated to consequently place the retaining means in engagement with the sliding bar.

3. A vehicle brake including slidably mounted brake means, a slidably mounted bar adapted to be operated by the draft animals, connecting means between the brake means and the bar whereby when the bar is moved the brake means will be applied, pivotally mounted retaining means normally engaged on the slidable bar, rotatable trip means for alternately holding the retaining means in and out of engagement with the sliding bar, manually operable means for actuating the trip to consequently allow the sliding bar to move and apply the brake means, and resilient means for returning the brake to an inoperative position and for sliding the bar in a reverse direction to a position where a subsequent operation of the trip means will place the retaining means in engagement with the bar.

In testimony whereof I affix my signature in presence of two witnesses.

GUY C. MARLEY.

Witnesses:
NELL GILBERT,
RICHARD ROSSMAN.

Copies of this patent may be obtained for five cents each, by addressing the "Commissioner of Patents, Washington, D. C."